(12) United States Patent
Narasimhan

(10) Patent No.: US 9,173,189 B2
(45) Date of Patent: **\*Oct. 27, 2015**

(54) DETERMINING WLAN EDGES

(71) Applicant: Aruba Networks, Inc., Sunnyvale, CA (US)

(72) Inventor: Partha Narasimhan, Saratoga, CA (US)

(73) Assignee: Hewlett-Packard Development Company, L.P., Houston, TX (US)

( \* ) Notice: Subject to any disclaimer, the term of this patent is extended or adjusted under 35 U.S.C. 154(b) by 0 days.

This patent is subject to a terminal disclaimer.

(21) Appl. No.: 14/307,088

(22) Filed: Jun. 17, 2014

(65) Prior Publication Data

US 2014/0293966 A1    Oct. 2, 2014

Related U.S. Application Data

(63) Continuation of application No. 13/023,395, filed on Feb. 8, 2011, now Pat. No. 8,755,272.

(60) Provisional application No. 61/302,413, filed on Feb. 8, 2010.

(51) Int. Cl.
| | |
|---|---|
| *H04L 12/26* | (2006.01) |
| *H04W 4/00* | (2009.01) |
| *H04L 12/28* | (2006.01) |
| *H04W 24/00* | (2009.01) |
| *H04W 64/00* | (2009.01) |
| *H04W 36/00* | (2009.01) |
| *H04W 84/12* | (2009.01) |
| *H04W 88/06* | (2009.01) |

(52) U.S. Cl.
CPC ........ *H04W 64/006* (2013.01); *H04W 36/0061* (2013.01); *H04W 36/0083* (2013.01); *H04W 36/0055* (2013.01); *H04W 84/12* (2013.01); *H04W 88/06* (2013.01)

(58) Field of Classification Search
CPC ......... H04W 4/00; H04W 4/02; H04W 4/027; H04W 4/021; H04W 4/023; H04W 8/005; H04W 8/02; H04W 8/183; H04W 24/00; H04W 24/02; H04W 28/08; H04W 28/10; H04W 36/00; H04W 36/0055; H04W 36/0066; H04W 36/0016; H04W 36/0061; H04W 36/0083; H04W 36/04; H04W 39/08; H04W 36/14; H04W 36/18; H04W 36/20; H04W 36/30; H04W 36/36; H04W 72/02; H04W 72/0406; H04W 72/082; H04W 72/085; H04W 40/246; H04W 48/00; H04W 48/02; H04W 48/08; H04W 48/10; H04W 48/12; H04W 48/14; H04W 48/16; H04W 48/18; H04W 48/20; H04W 52/0219; H04W 52/0225; H04W 52/0245; H04W 52/0254; H04W 60/00; H04W 64/00; H04W 64/006; H04W 68/02; H04W 68/12; H04W 84/12; H04W 88/08; H04W 92/02; H04W 4/06; H04W 36/005; H04W 36/08; H04W 36/22; H04W 36/32; H04W 48/04; H04W 52/0206; H04W 52/0241; H04W 64/003; H04W 76/00; H04W 76/002; H04W 76/208; H04W 80/04; H04W 84/04; G01S 5/0009; G01S 5/02; G01S 5/0236; G01S 5/0242; G01S 5/0252; G01S 5/0263; G01S 5/0284; H04L 63/101; H04L 67/1021; H04L 67/1063; H04L 2209/80; G06Q 30/0261; H04B 7/00; H04B 17/309; H04B 17/318; H04B 17/382; H04M 15/58; H04N 21/25841

USPC ................. 370/241–252, 400–411, 310–351, 370/395.2, 395.21, 431, 437, 449, 370/461–462; 455/13.4, 127.1, 127.5, 455/179.1, 421–423, 431–464, 522, 574, 455/404.2, 422.1–423

See application file for complete search history.

(56) References Cited

U.S. PATENT DOCUMENTS

| | | |
|---|---|---|
| 6,430,414 B1 | 8/2002 | Sorokine et al. |
| 7,236,788 B2 | 6/2007 | Mohebbi |
| 7,447,174 B2 | 11/2008 | Joshi |
| 7,535,883 B2 | 5/2009 | Kim et al. |

| | | |
|---|---|---|
| 7,706,337 B2 | 4/2010 | Pandey et al. |
| 7,733,831 B2 | 6/2010 | Samuel et al. |
| 7,917,145 B2 * | 3/2011 | Mahany et al. ............ 455/435.1 |
| 8,023,468 B2 | 9/2011 | Liu et al. |
| 8,095,134 B2 | 1/2012 | Huang et al. |
| 8,144,662 B2 | 3/2012 | Xing et al. |
| 8,190,168 B2 * | 5/2012 | Wong et al. ................ 455/452.1 |
| 8,204,442 B2 | 6/2012 | Sankar et al. |
| 8,320,331 B2 | 11/2012 | Vikberg et al. |
| 8,483,709 B2 * | 7/2013 | Park et al. .................. 455/456.1 |
| 8,738,055 B2 * | 5/2014 | Kim et al. ...................... 455/507 |
| 8,755,272 B2 * | 6/2014 | Narasimhan .................. 370/230 |
| 8,842,633 B2 * | 9/2014 | Dwyer et al. ................. 370/331 |
| 8,848,656 B2 * | 9/2014 | Horn et al. .................... 370/331 |
| 2007/0258393 A1 * | 11/2007 | Cam-Winget et al. ........ 370/310 |
| 2007/0281700 A1 | 12/2007 | Deguchi et al. |
| 2009/0219888 A1 * | 9/2009 | Chen et al. .................... 370/331 |
| 2010/0069072 A1 | 3/2010 | Gogic et al. |
| 2012/0015649 A1 | 1/2012 | Li et al. |
| 2012/0307927 A1 | 12/2012 | Nammi et al. |

* cited by examiner

*Primary Examiner* — Tri H Phan

(57) ABSTRACT

Determining whether a station is at the edge of wireless local area network (WLAN) coverage. In an IEEE 802.11 wireless network comprising one or more access points (APs) which may optionally be connected to one or more controllers, with wireless clients connected to those APs. Station S connected to AP A collects reports such as beacon reports which contains information on all APs station S can hear, including signal strengths. AP A collects a neighbor report which contains information on all APs in its neighborhood including signal strengths. These reports from A and S are observed and compared over time to determine when S is at or is moving to the edge of WLAN coverage. For example, if the only entry in the beacon list for client S is AP A to which it is connected, and the signal strength is decreasing over time, S is at the edge of WLAN coverage and is moving away from the WLAN. The process may be implemented at a controller, at a client, or both.

21 Claims, 1 Drawing Sheet

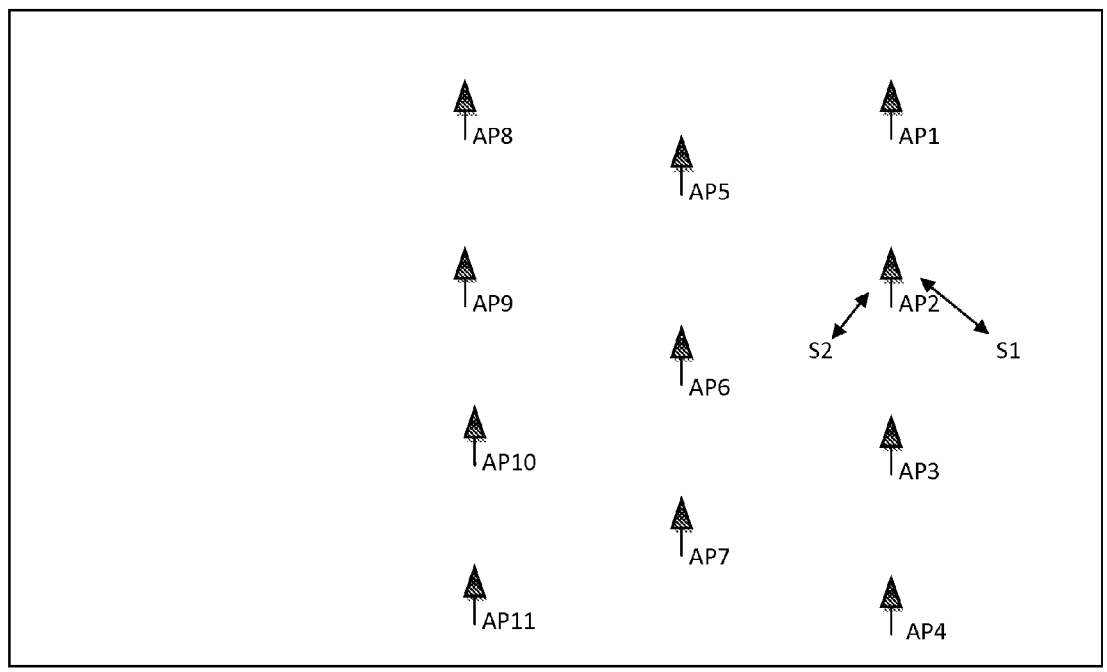

DETERMINING WLAN EDGES

PRIORITY CLAIM; INCORPORATION BY REFERENCE

This application claims the benefit as a Continuation of U.S. Non-Provisional application Ser. No. 13/023,395 filed on Feb. 8, 2011 which claims priority or U.S. Provisional Patent Application No. 61/302,413 filed Feb. 8, 2010, both of which are hereby incorporated by reference.

BACKGROUND OF THE INVENTION

The present invention relates to wireless digital networks, and in particular, to the problem of determining when a station is at the edge of wireless local area network (WLAN) coverage.

Wireless digital networks are becoming ubiquitous in enterprises, providing secure and cost-effective access to resources. Those networks usually have one or more controllers, each controller supporting a plurality of access points (AP) deployed through the enterprise. WiFi networks operating in accordance with IEEE 802.11 standards are examples of such networks.

Also increasing in popularity are dual-mode handsets, which are handsets supporting not only a cellular/wireless wide area network (WWAN) interface, for example, GSM, CDMA, 3G or 4G, but also a wireless interface such as IEEE 802.11 WiFi. Such dual-mode handsets when used with properly configured and operating wireless local area networks (WLANs) offer the use of WiFi connections while the handset is within the enterprise, and cellular connections while outside the enterprise.

Handover of voice calls and data sessions between cellular and WLAN networks is a key concern for handset users and the designers of the WLANs they use.

In order to aid the timely handover of calls and sessions from a WiFi network to a WWAN, it is important to recognize when a dual-mode handset that is using WiFi is approaching the edge of WLAN coverage and is at risk of losing that coverage so that the required signaling can be completed between the WLAN and the WWAN to transition calls and/or data sessions before WLAN coverage is completely lost.

Being on the edge of WLAN coverage is a property of a client associated to a WiFi network. A initial assessment of this property may be made by identifying those APs along the edge of the WLAN; clients associated to one of these edge APs are on the edge of the WLAN. But association with an edge AP is not sufficient. Two clients may be associated with the same edge AP and be in different states. As an example, one client may be moving away from the edge AP and into the interior of the network. The other client may be moving away from the edge AP and away from the WLAN network entirely.

What is needed is a way of better identifying client devices on the edge of WLAN coverage in the network.

BRIEF DESCRIPTION OF THE DRAWINGS

The invention may be best understood by referring to the following description and accompanying drawings that are used to illustrate embodiments of the invention in which:

FIG. 1 shows clients in a wireless network.

DETAILED DESCRIPTION

Embodiments of the invention relate to methods determining whether a wireless client is at the edge of wireless local area network (WLAN) coverage. A WLAN has a plurality of access points (APs) which optionally may be supported by one or more controllers. Wireless client S is connected to AP A. Station S collects reports which contain information on all APs station S can hear, including signal strengths. AP A collects a neighbor report which contains information on all APs in its neighborhood including signal strengths. These reports from A and S are observed and compared over time to determine when S is at or is moving to the edge of WLAN coverage. For example, if the only entry in the station list for client S is AP A to which it is connected, and the signal strength is decreasing over time, S is at the edge of WLAN coverage and is moving away from the WLAN. The process may be implemented at a controller, at a client, or both.

FIG. 1 shows a network in which AP1-AP11 are access points on a wireless network. Stations S1 and S2 are portable wireless clients.

As is known to the art, access points AP1-AP11 are purpose-made digital devices, each containing a processor, memory hierarchy, and input-output interfaces. In one embodiment of the invention, a MIPS-class processor such as those from Cavium or RMI is used. Other suitable processors, such as those from Intel or AMD may also be used. The memory hierarchy traditionally comprises fast read/write memory for holding processor data and instructions while operating, and nonvolatile memory such as EEPROM and/or Flash for storing files and system startup information. Wired interfaces are typically IEEE 802.3 Ethernet interfaces, used for wired connections to other network devices such as switches, or to a controller. Wireless interfaces may be WiMAX, 3G, 4G, and/or IEEE 802.11 wireless interfaces. In one embodiment of the invention, access points AP1-AP11 operate under control of a LINUX operating system, with purpose-built programs providing host controller and access point functionality.

Similarly, stations S1 and S2 are wireless client devices with similar architectures, comprising at least a processor, memory hierarchy, and input/output interfaces including a wireless interface with which to communicate with APs AP1-AP11. Examples of such devices include dual-mode phones, laptop, and handheld systems using IEEE 802.11 wireless interfaces.

According to the invention, station S collects a list of APs it can hear through its wireless interface, including signal strengths.

Similarly according to the invention, at least the AP to which S is connected, and preferably all APs in the network collect lists or reports of APs in its neighborhood that it can hear through its wireless interface, including their signal strengths.

According to the IEEE 802.11k amendment, an AP neighbor report is a list of IEEE 802.11 access points (APs) and their received signal strengths that a particular AP considers its neighbors on the wireless network. This list may be refreshed periodically or on demand.

Also according to the IEEE 802.11kl draft standard, a beacon report is a list of APs that a client station can hear, including received signal strengths. A beacon report can contain the list of APs in a client station's cache based on periodic background scans, or an AP can request that the client station perform a new scan and report the results back to the AP.

According to the present invention, a client station is said to be at the edge of WLAN coverage if it is at risk of losing a good signal to the AP that it is currently associated to, and the client station is not able to move to another AP in the WLAN before WLAN connectivity is lost.

Identifying APs that form the edge of a WLAN is known to the art. One method is to simply mark an AP as an edge AP based on its physical location. This determination is made, for example, during installation of the AP and the wireless network.

While it is necessary for a client station to be associated with an edge AP to be at the edge of WLAN coverage, this condition is not in and of itself sufficient. Not all client stations associated to an edge AP are on the edge of WLAN coverage.

Referring to FIG. 1, client stations S1 and S2 are both associated to AP2, which is an edge AP. But client station S2 is located towards the interior of the WLAN coverage area, while client station S1 is on the edge of the WLAN coverage area.

Referring now to FIG. 2, assume client station S1 is associated to AP2. According to an aspect of the invention, the beacon report from client station S1 and the neighbor report from AP AP2 are compared to determine if client station S1 is on or moving to the edge of the WLAN coverage area.

In the description following, let $S_B$ denote the set of APs contained in the beacon report from client station S, and let $A_N$ denote the set of APs in the neighbor report for AP A. there are multiple outcomes from the comparison of these two sets.

Case 1: $S_B$ is not a subset of $A_N$, i.e. $S_B$ contains some elements that are not also members of $A_N$. In this case, client station S can hear APs that are not in AP A's neighbor list. This is most likely to happen when client station S is in the interior of the network. If AP A is an edge AP, and the size of the subset of $S_B$ whose members are not in $A_N$ is increasing, then client station S is moving towards the interior of the network.

Case 2: $S_B$ is a subset of $A_N$ and the signal strength from some of the APs in $S_B$ increase across multiple beacon reports. $S_B$ could either be a proper subset of $A_N$ or be equal to $A_N$. If AP A is an edge AP, then the most likely scenario here is that the station is moving in a direction that is perpendicular to the periphery of WLAN coverage. Given that the station is finding APs that are increasing in signal strength it is less likely to be at a location where there is risk of total loss of WLAN coverage.

Case 3: $S_B$ is a subset of $A_N$ and the signal strength from all the APs in $S_B$ are decreasing across multiple beacon reports. $S_B$ could either be a proper subset of $A_N$ or be equal to $A_N$. If AP A is an edge AP, then the most likely scenario here is that the station is moving towards the periphery of WLAN coverage area and is at risk of losing WLAN coverage.

Case 4: AP A is the only member of $S_B$. The station is not able to hear any AP other than the one it is currently associated to. If the signal strength of the link to AP A is decreasing and falls below a certain threshold then the station is at very high risk of losing WLAN coverage.

It is useful to note that this process may be implemented in the client device, or in the WLAN, at the APs, or in the controller responsible for the APs.

When implemented in the client device, the client can initiate transition of WiFi calls and/or data sessions to WWAN. When implemented in APs or in the controller, the controller may initiate the transition of the client from WiFi to WWAN.

As is understood in the art, the controller and access points are purpose-built digital devices, each containing a CPU for executing instructions and manipulating data, a memory hierarchy for storing data and instructions, and input/output devices such as wired and wireless communications ports.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

The invention claimed is:

1. A method comprising:
    identifying a neighbor list of access points within a wireless range of a first access point;
    identifying an AP list of access points within a wireless range of a client device, wherein the client is within a wireless range of the first access point; and
    determining that the client device is moving toward an edge of a wireless coverage area, wherein determining includes using a comparison of the neighbor list and the AP list, and wherein the wireless coverage area corresponds to a plurality of access points on a wireless network.

2. The method of claim 1, wherein determining that the client device is moving toward an edge of a wireless coverage area includes identifying a change in signal strength between the client device and one or more access points in AP list.

3. The method of claim 1, wherein the AP list includes one or more access points detected by the client device over different periods of time.

4. The method of claim 1, wherein the neighbor list is identified using wireless signals detected by the first access point.

5. The method of claim 1, wherein determining that the client device is moving toward an edge of a wireless coverage area includes determining that the client device is unable to associate with another access point in the plurality of access points.

6. The method of claim 1, further comprising:
    initiating a transfer of active calls or data sessions for the client device from the first access point to another device in a Wireless Wide Area Network (WWAN).

7. The method of claim 1, wherein identifying that a neighbor list of access points is within a wireless range of an access point includes determining that access points in the neighbor list of access points are within a wireless communication range of the first access point.

8. A computing device comprising:
one or more processors; and
a memory having instructions stored thereon, which when executed by the one or more processors, cause the computing device to perform operations including:
identifying a neighbor list of access points within a wireless range of a first access point;
identifying an AP list of access points within a wireless range of a client device, wherein the client is within a wireless range of the first access point; and
determining that the client device is moving toward an edge of a wireless coverage area, wherein determining includes using a comparison of the neighbor list and the AP list, and wherein the wireless coverage area corresponds to a plurality of access points on a wireless network.

9. The computing device of claim 8, wherein determining that the client device is moving toward an edge of a wireless coverage area includes identifying a change in signal strength between the client device and one or more access points in AP list.

10. The computing device of claim 8, wherein the AP list includes one or more access points detected by the client device over different periods of time.

11. The computing device of claim 8, wherein the neighbor list is identified using wireless signals detected by the first access point.

12. The computing device of claim 8, wherein determining that the client device is moving toward an edge of a wireless coverage area includes determining that the client device is unable to associate with another access point in the plurality of access points.

13. The computing device of claim 8, further comprising instructions, which when executed by the one or more processors, cause the computing device to perform operations including:
initiating a transfer of active calls or data sessions for the client device from the first access point to another device in a Wireless Wide Area Network (WWAN).

14. The computing device of claim 8, wherein identifying that a neighbor list of access points is within a wireless range of an access point includes determining that access points in the neighbor list of access points are within a wireless communication range of the first access point.

15. A computer-program product tangibly embodied in a non-transitory machine-readable storage medium, including instructions configured to cause a data processing apparatus to:
identify a neighbor list of access points within a wireless range of a first access point;
identify an AP list of access points within a wireless range of a client device, wherein the client is within a wireless range of the first access point; and
determine that the client device is moving toward an edge of a wireless coverage area, wherein determining includes using a comparison of the neighbor list and the AP list, and wherein the wireless coverage area corresponds to a plurality of access points on a wireless network.

16. The computer-program product of claim 15, wherein determining that the client device is moving toward an edge of a wireless coverage area includes identifying a change in signal strength between the client device and one or more access points in AP list.

17. The computer-program product of claim 15, wherein the AP list includes one or more access points detected by the client device over different periods of time.

18. The computer-program product of claim 15, wherein the neighbor list is identified using wireless signals detected by the first access point.

19. The computer-program product of claim 15, wherein determining that the client device is moving toward an edge of a wireless coverage area includes determining that the client device is unable to associate with another access point in the plurality of access points.

20. The computer-program product of claim 15, further comprising instructions configured to cause the data processing apparatus to:
initiate a transfer of active calls or data sessions for the client device from the first access point to another device in a Wireless Wide Area Network (WWAN).

21. The computer-program product of claim 15, wherein identifying that a neighbor list of access points is within a wireless range of an access point includes determining that access points in the neighbor list of access points are within a wireless communication range of the first access point.

* * * * *